No. 750,945. Patented February 2, 1904.

UNITED STATES PATENT OFFICE.

ALBERT BUSCH, OF BRUNSWICK, GERMANY, ASSIGNOR TO THE FIRM OF BAUER & CO., OF BERLIN, GERMANY.

PROCESS OF MAKING WATER-SOLUBLE ALBUMINOUS COMPOUNDS.

SPECIFICATION forming part of Letters Patent No. 750,945, dated February 2, 1904.

Application filed May 26, 1903. Serial No. 158,767. (No specimens.)

*To all whom it may concern:*

Be it known that I, ALBERT BUSCH, a subject of the Duke of Brunswick, residing at Brunswick, in the Duchy of Brunswick, German Empire, have invented a new and useful Process of Manufacturing Water-Soluble Albuminous Compounds, of which the following is a specification.

I have found that salts, and in particular alkali salts of certain organic combinations of phosphoric acid, have the property of rendering certain albumin compounds—for instance, casein or alkali albuminates, both vegetable and animal—soluble in water. Of salts, and in particular alkali salts, which are suitable for this purpose, fatty acid substituted glycerin phosphoric acids may be used, such as mono and di stearyl-glycerin phosphoric acid, mono and di palmityl-glycerin phosphoric acid, and mono and di oleyl-glycerin phosphoric acid.

The formula of the fatty acid glycerin phosphoric acids is as follows:

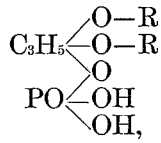

the letter R designating the radical of the fatty acids.

The new preparations are readily absorbable by the human system, and being less soluble in cold water than most similar soluble casein preparations they are more tasteless than the same and will consequently more willingly be taken by patients.

The preparation of palmityl and oleyl glycerin phosphoric acids is effected in an analogous manner, as that of stearyl-glycerin phosphoric acid, the preparation of which will be described hereinafter.

As an instance for carrying the invention into effect the following directions may be given: Ninety-five parts of casein are mixed with ten parts of a fifty-per-cent. solution of di-sodium di-stearyl-glycerin phosphate (for the preparation of which see *Hundeshagen, Journal für Praktische Chemie*, (2,) 28, 240, and so on) held in suspension in an aqueous or alcoholic liquid, and then the mixture is dried at as low a temperature as possible and preferably *in vacuo*. Or if alkali albuminate is used instead of casein the proportions are just the same. The ground product being dissolved very little swells up in cold water, but solution takes readily place on heating.

The preparation of the other combinations mentioned above can be effected in an analogous manner. Instead of alcohol other liquids having no effect on the materials—such as ether, acetone, and the like—may be used.

The underlying principle of the invention having been precisely set forth in the above description, it is obvious that the proportions of the ingredients used may be altered in certain limits without deviating from the principle of this invention, which, generally speaking, consists in converting the above-mentioned albuminous compounds by combination with salts and with alkali salts in particular of the above-described organic combinations with phosphoric acids into a water-soluble form of greater absorbing capacity.

What I claim, and desire to secure by Letters Patent of the United States of America, is—

The process of manufacturing water-soluble albuminous compounds which consists in combining albuminous compounds insoluble in water but soluble in alkali with alkali salts of fatty acid substituted glycerin phosphoric acids, substantially as specified.

In witness whereof I have hereunto signed my name in the presence of two subscribing witnesses.

ALBERT BUSCH.

Witnesses:
 MAX CLARUS,
 JULIUS DECKEL.